(12) United States Patent
Esh

(10) Patent No.: US 7,032,425 B1
(45) Date of Patent: Apr. 25, 2006

(54) FOLDING SUPPORT ASSEMBLY

(76) Inventor: Emanuel S. Esh, 215 Snake Hill Rd., Bird In Hand, PA (US) 17505

( * ) Notice: Subject to any disclaimer, the term of this patent is extended or adjusted under 35 U.S.C. 154(b) by 79 days.

(21) Appl. No.: 10/931,006

(22) Filed: Aug. 31, 2004

(51) Int. Cl.
*B21D 5/04* (2006.01)
*A47B 5/04* (2006.01)

(52) U.S. Cl. .................. 72/319; 248/284.1; 248/276.1; 248/637

(58) Field of Classification Search .................. 72/319; 248/637, 646, 655, 664, 666, 166, 674, 671, 248/284.1, 276.1, 291.1, 184.1; 280/760; 108/44; 269/901, 139
See application file for complete search history.

(56) References Cited

U.S. PATENT DOCUMENTS

| 1,284,776 | A | * | 11/1918 | Richard | ........................ | 108/99 |
|---|---|---|---|---|---|---|
| 1,412,630 | A | * | 4/1922 | Richard | ........................ | 108/99 |
| 2,162,855 | A | | 6/1939 | Nelson | | |
| 2,636,549 | A | | 4/1953 | Geller | | |
| 2,835,522 | A | | 5/1958 | Serto | | |
| 2,852,176 | A | * | 9/1958 | Harmon | ........................ | 182/78 |
| 3,051,261 | A | * | 8/1962 | Webb, Sr. et al. | ............ | 182/78 |
| 4,159,821 | A | * | 7/1979 | Hickman | ..................... | 269/139 |
| 4,382,641 | A | * | 5/1983 | Abel | ........................... | 312/21 |
| 4,756,500 | A | | 7/1988 | Baker | | |
| 5,190,259 | A | * | 3/1993 | Okazaki | .................. | 248/311.2 |
| 5,538,214 | A | * | 7/1996 | Sinila | ...................... | 248/278.1 |
| 6,450,467 | B1 | * | 9/2002 | Timm | ...................... | 248/284.1 |
| 6,701,767 | B1 | | 3/2004 | Hartwell | | |

* cited by examiner

*Primary Examiner*—Daniel C. Crane
(74) *Attorney, Agent, or Firm*—Martin Fruitman

(57) ABSTRACT

The apparatus is a support assembly for attaching a heavy tool on the side of a truck and for unfolding it from a storage position into a horizontal work position. At least one foldable support assembly is constructed from two channels, an extension channel pivoting down from within a mounting channel on the side of the truck, using a pivot located near the bottom of the mounting channel and near one end of the extension channel. A tool support pivots around the opposite end of the extension channel to form a support for a horizontal tool, but the entire assembly folds up flush against the truck. The folded size is minimized by each of the parts fitting within the adjacent part. An energy storage device such as a spring is also located within the support assembly and counteracts the weight of the support assembly and the tool to ease folding and unfolding the apparatus. A latch holds the assembly securely folded.

13 Claims, 5 Drawing Sheets

FOLDING SUPPORT ASSEMBLY

BACKGROUND OF THE INVENTION

This patent deals generally with truck mounted tools and more specifically with a foldable support assembly for mounting a sheet metal bending brake or any other tool on a truck body or other surface and unfolding it to a working position for using the tool.

Sheet metal bending brakes are commonly available tools and well know and understood. Using mechanical leverage, they are typically used to bend a piece of sheet metal along its length by clamping the sheet metal and folding part of it over with a hinged part of the brake. Sheet metal brakes have substantial application in the construction industry where they are used for bending siding and forming roof gutters. However, on site use in such applications requires carrying the heavy sheet metal brake to the site and then setting it up for use.

Several patents have been granted for the transportation of such sheet metal brakes. U.S. Pat. No. 2,162,855 to Nelson and U.S. Pat. No. 6,701,767 to Hartwell both mount brakes aboard trailers, but the more desirable method of transporting sheet metal brakes appears to be aboard pickup trucks. In the metal siding and roofing trades most companies already operate pickup trucks with metal racks installed on the sides and top to carry ladders and material, so there have been some structures attached to such truck racks to carry sheet metal brakes and pivot them down into an operating position. U.S. Pat. No. 4,756,500 to Baker and the ABC Supply Co. Inc. Spring 2004 catalog disclose such pivoting structures, but they leave something to be desired. Particularly, neither of those pivoting brake structures furnishes any aid in lowering the quite heavy brake and its support structure into the working position or lifting it back into the transport position. Furthermore, the ABC Supply unit requires a truck rack constructed of square tubing and both units require significant modification of conventional truck racks.

It would be very beneficial to have a heavy tool carrier that provided mechanical aid in lowering the tool into its working position and lifting the tool back into its transport position. It would be even better if the truck rack modification was minimized and the working location of the tool did not interfere with side storage cabinets on the truck sides.

DETAILED DESCRIPTION OF THE INVENTION

Figure 1:
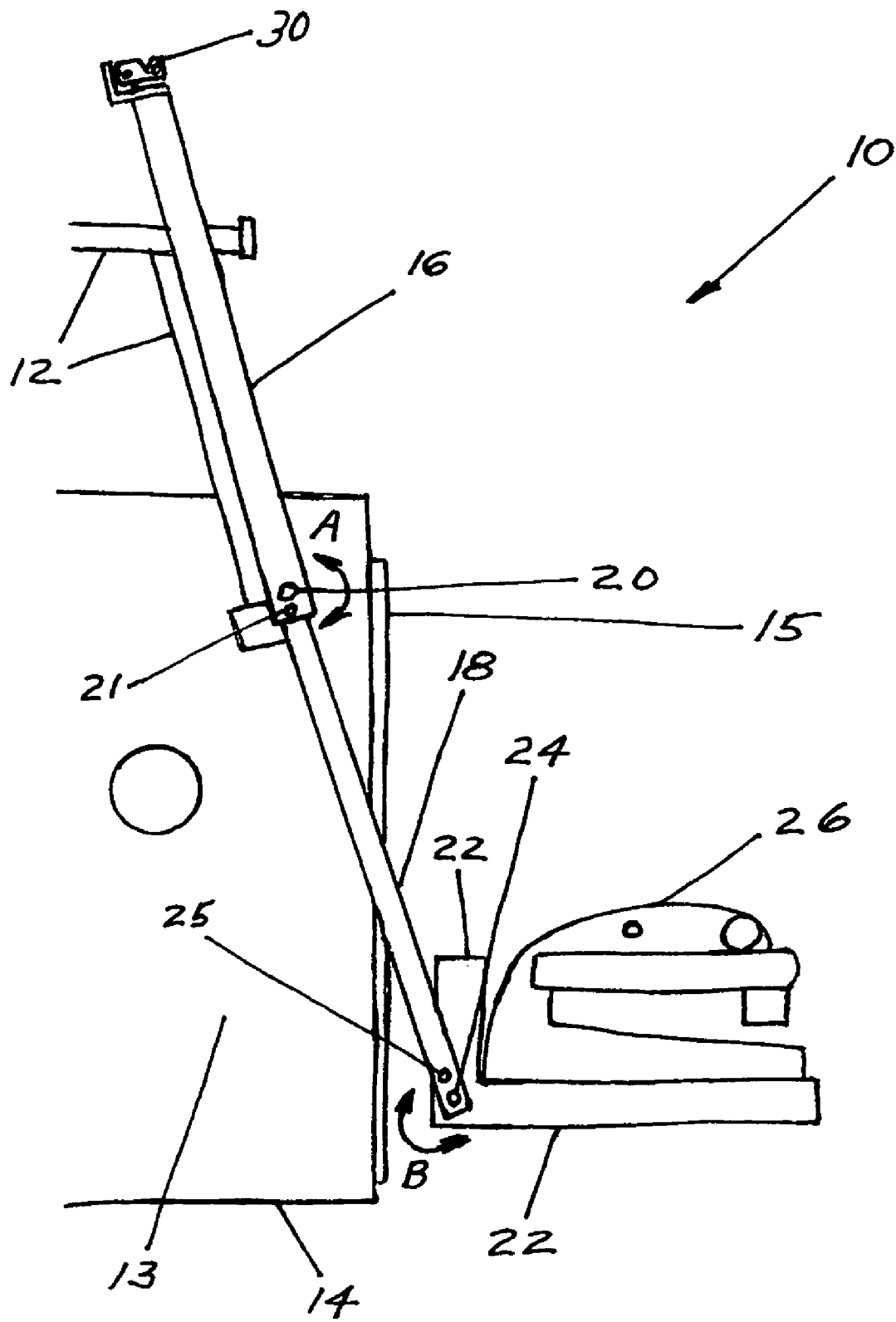
FIG. 1 is a side view of the foldable support assembly of the preferred embodiment opened to its working position.
Figure 2:
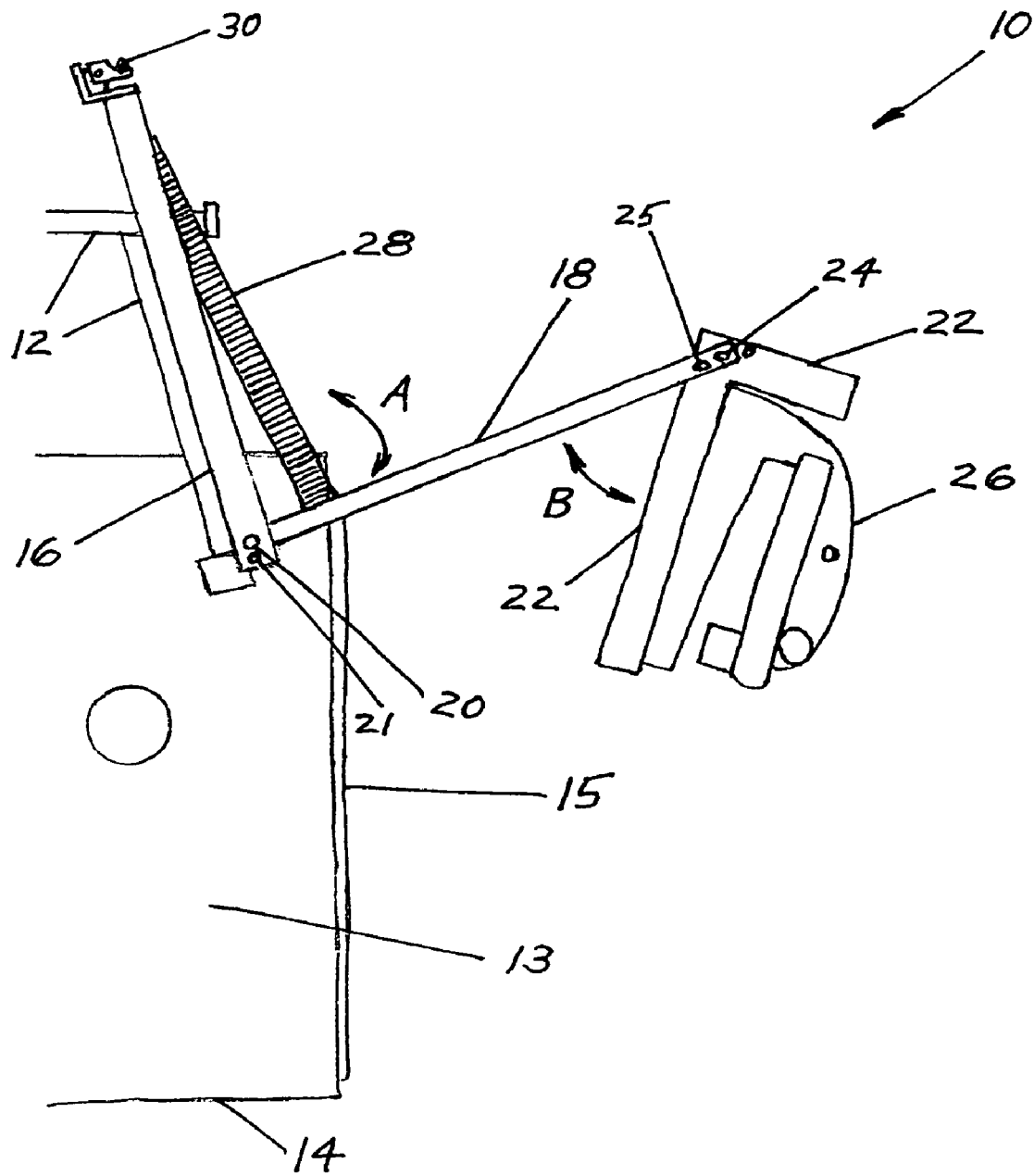
FIG. 2 is a side view of the foldable support assembly of the preferred embodiment oriented between its transport position and its working position.
Figure 3:
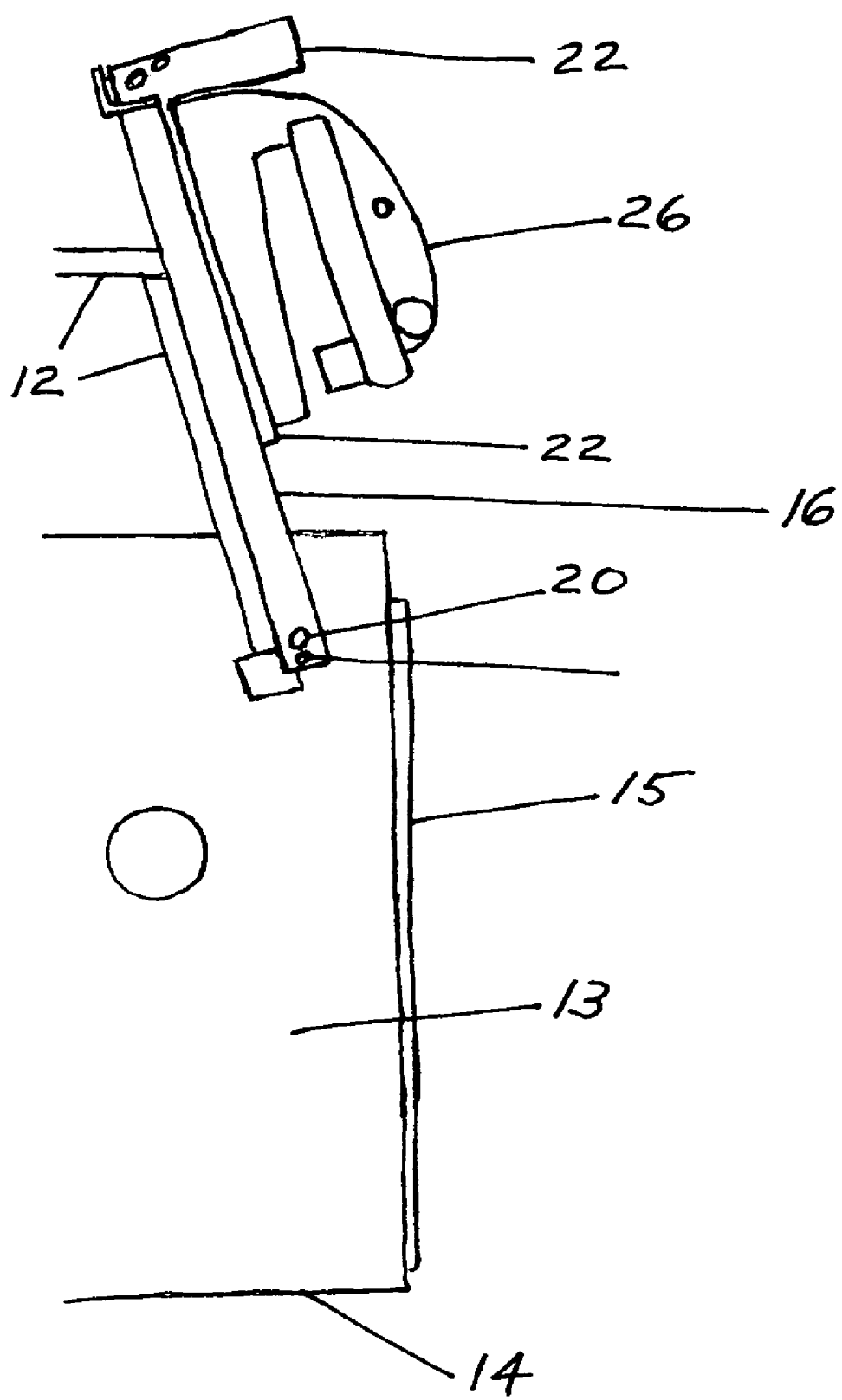
FIG. 3 is a side view of the foldable support assembly of the preferred embodiment folded into its transport position.

FIG. 1 is a side view of support assembly 10 of the preferred embodiment when it is opened to its working position. Support assembly 10 is attached to truck rack 12 by the use of fasteners (not shown) through penetrating holes 17 in mounting channel 16. Holes 17 are seen only in FIG. 4. Truck rack 12 is itself mounted on truck body 14 by conventional means. It should be appreciated that the structures seen in FIGS. 1–3 are all shown with mounting channel 16 attached at rear panel 13 of truck body 14, and that there is a similar foldable support assembly attached at the front end of truck body 14. Both of these support assemblies are easily mounted on truck rack 12 that is itself installed on rear panel 13 and the similar front panel of truck body 14. When mounting channels 16 are installed in those locations on the front and rear panels of truck body 14, there is no interference with access to storage compartment doors 15 by any of the parts of support assembly 10 in either the working position shown in FIG. 1 or the transport position shown in FIG. 3.

When not in use, extension channel 18 is stored within mounting channel 16, and for use in the working position shown in FIG. 1, extension channel 18 pivots out of mounting channel 16 around pivot point 20 in the downward direction indicated by directional arrow A. Tool support 22, to which sheet metal brake 26 is attached, pivots around pivot rod 24 at the end of extension channel 18 in order to be placed in the working position shown in FIG. 1. The directions of this pivoting action by tool support 22 are indicated by directional arrow B.

When extension channel 18 and tool support 22 are in the working position shown in FIG. 1, locking pins (not shown) are inserted into hole 21 in the sidewall of mounting channel 16 and hole 25 in the sidewall of extension channel 18. One locking pin passes completely through hole 21 and into a matching aligned hole in extension channel 18, and a second locking pin penetrates hole 25 and into a matching aligned hole in tool support 22.

The pivoting actions of extension channel 18 and tool support 22 can be better appreciated by viewing FIG. 2, which is a side view of support assembly 10 of the preferred embodiment when it is partially unfolded between its transport position and its working position. This position is passed through during both the action of unfolding support assembly 10 to put it into the working position shown in FIG. 1 and the action of folding support assembly 10 up into its transport position shown in FIG. 3.

Figure 4:
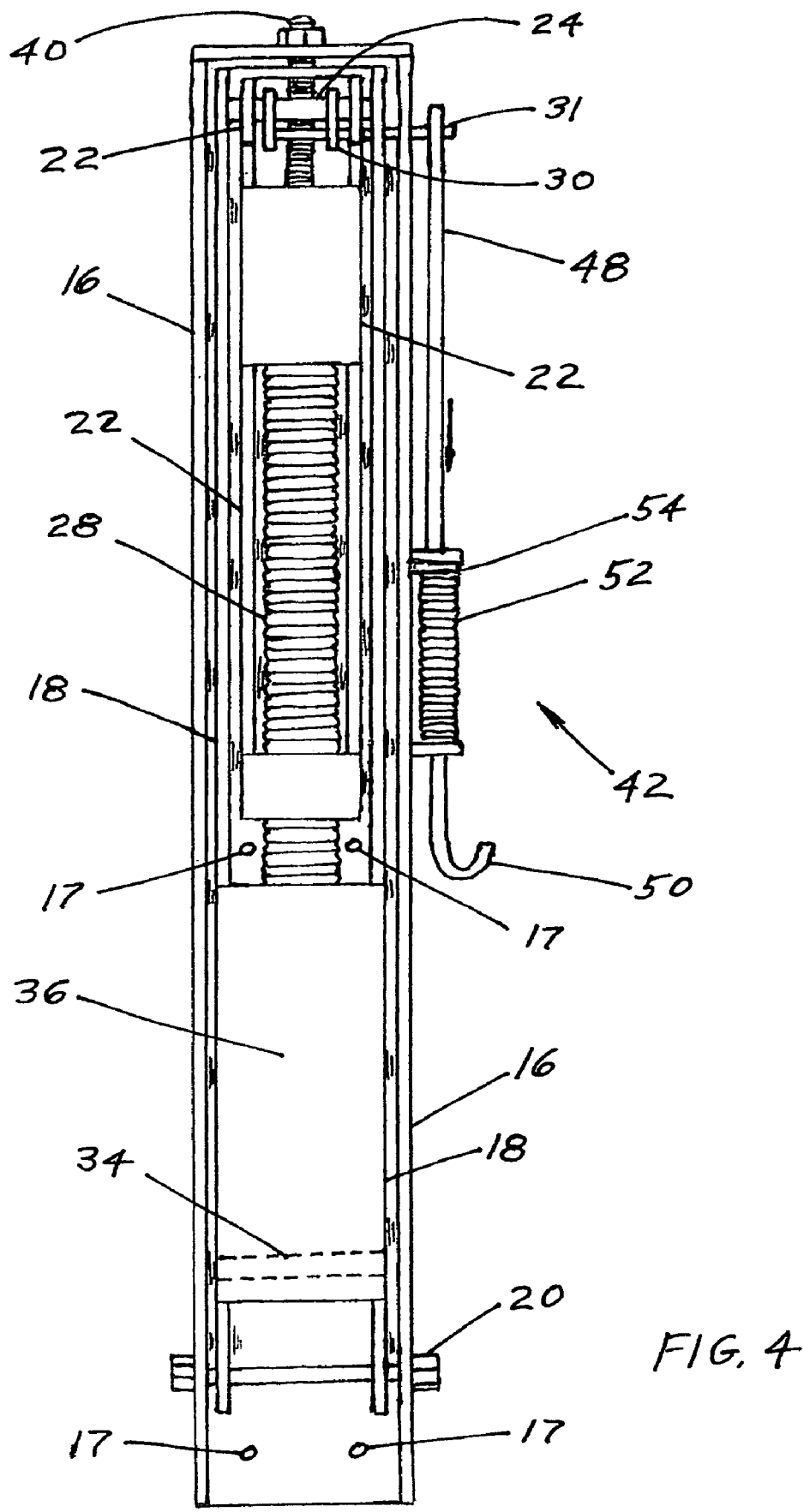
FIG. 4 is a front view of the mounting channel and the counterbalancing spring mechanism of the foldable support assembly of the preferred embodiment.

All the part identifying numbers are the same in FIGS. 1–5. However, spring 28 is not visible in FIG. 1 and FIG. 3 because it fits within mounting channel 16 and extension channel 18 when it is fully extended when support assembly 10 is in the working position as shown in FIG. 1. Spring 28 is also not visible when support assembly 10 is in its transport position as shown in FIG. 3, because, as shown in FIG. 4, it is at rest within tool support 22. Spring 28 is particularly valuable because without it the entire rather heavy combined weights of sheet metal brake 26, tool support 22, and extension channel 18 would have to be lifted into the transport position (seen in FIG. 3) unaided, and during unfolding, the heavy weight of support assembly 10 and a tool would also be quite difficult to control.

Spring 28 is dimensioned to fit within tool support 22 when spring 28 is at rest when tool support 22 is completely folded into extension channel 18. Spring 28 then begins to extend and counterbalance the weight of foldable support assembly 10 against gravity as extension channel 18 pivots out of mounting channel 16 as foldable support assembly 10 is being lowered. As extension channel 18 pivots out of mounting channel 16, spring 28 stretches and stores the energy so that its spring force will be used to help fold the assembly back up without lifting the entire weight manually. It should be appreciated that springs are not the only devices that can accomplish this energy storage and retrieval action. A pulley with a cable and weight would also perform that function, but hydraulic and pneumatic cylinders would fit better into the useable spaces within mounting channel 16, extension channel 18, and tool support 22.

Figure 5:
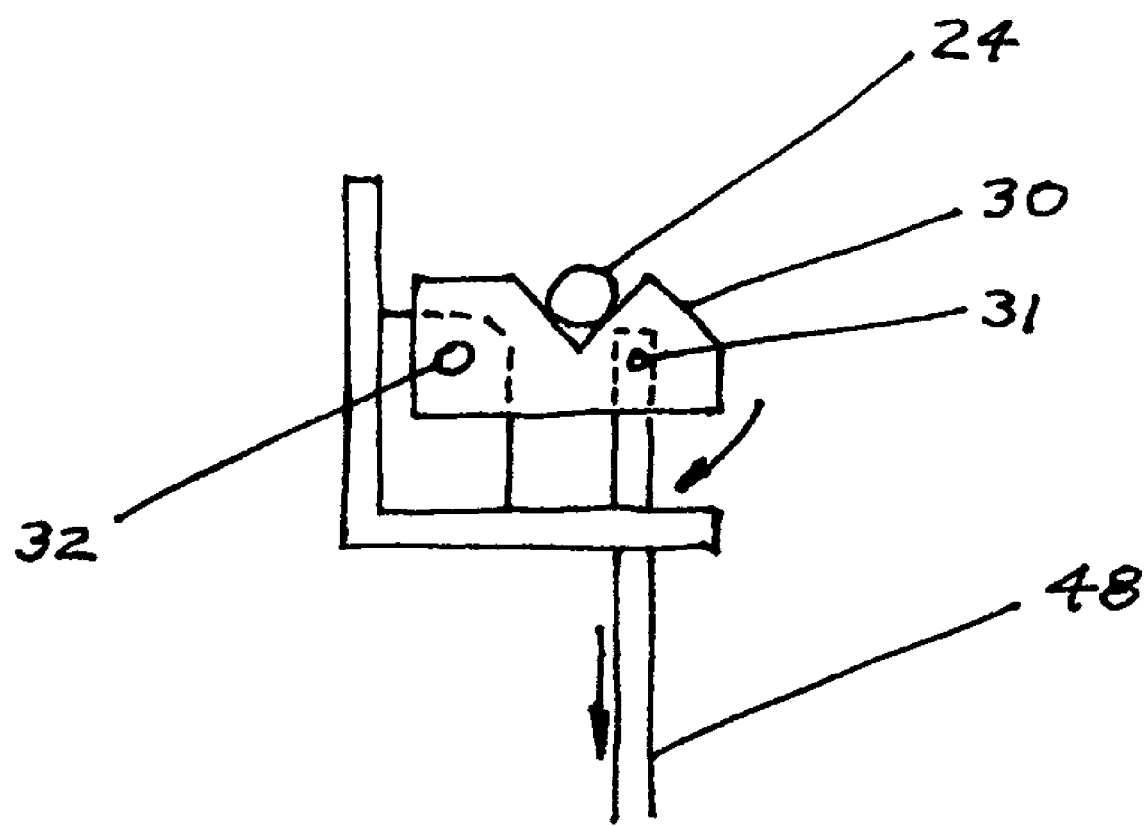
FIG. 5 is an enlarged side view of the latch apparatus for holding the support assembly in its transport position.

Latch 30, shown in FIGS. 1, 2, and 5, is mounted on mounting channel 16 and is used to lock entire foldable support assembly 10 into place in the transport position shown in FIG. 3. As shown in FIG. 3, for the transport position, tool support 22 is swung upward and moves slightly over center until latch 30 captures pivot rod 24. Release mechanism 42 for latch 30 is shown in FIG. 4, and latch 30 is shown more clearly in FIG. 5.

FIG. 4 is a front view of foldable support assembly 10 of the preferred embodiment as seen from the side of truck body 14 without sheet metal brake 23 mounted on tool support 22. FIG. 4 shows the interleaving structure of foldable support assembly 10 which is also apparent from FIG. 3 in which extension channel 18, counterbalancing spring 28, and most of tool support 22 are hidden within mounting channel 16 when support assembly 10 is folded. As seen in FIG. 4, mounting channel 16 is the outermost structure of folded support assembly 10, and extension channel 18 is the closest structure to and is dimensioned to fit within mounting channel 16. Tool support 22 is then dimensioned to fit within extension channel 18, and counterbalancing spring 28 is at the center of foldable support assembly 10 and dimensioned to fit within tool support 22.

FIG. 4 also shows several features which can not be seen in the other views. Anchor 34, shown with dashed lines, is located adjacent to the end of extension channel 18, near the bottom of FIG. 4, holds one end of counterbalancing spring 28, and is covered by web 38 of extension channel 18. The other end of counterbalancing spring 28 is anchored by nut and bolt assembly 40 at the closed end of mounting channel 16, seen at the top of FIG. 4. Holes 17 are used for fasteners (not shown) to hold mounting channel 16 on truck rack 12 as shown in FIGS. 1–3.

Another apparatus that is seen in FIG. 4, part of which is also seen in FIG. 5, is latch release assembly 42. Latch release assembly 42 eliminates the need to reach to the top of mounting channel 16 to release latch 30. Latch release assembly 42 operates by release rod 48 being pulled down. This also pulls down cross rod 31 which pivots latch 30 down on pivot point 32 (see FIG. 5) to release pivot rod 24 of tool support 22 from latch 30. The motion of release rod 48 is accomplished by pulling down on handle 50. The downward motion of release rod 48 is counteracted by latch spring 52 which is compressed by washer 54 attached to release rod 48. When release rod 48 is released, it moves up due to the force of release spring 52, and latch 30 pivots back and is held in its rest position that permits it to later recapture tool support 22.

Foldable support assembly 10 of the invention thereby furnishes a convenient support for not only a sheet metal brake, but also for any other tool that is convenient to carry on a truck rack and to lower for use in the field. In fact, the structure of foldable support assembly 10 can also conveniently be used on a building wall, for instance, for a work bench that folds up when not in use.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, other energy storage devices can be used instead of counterbalancing spring 28, and other latches, latch locations, and latch releases are also possible. Furthermore, although the preferred embodiment of the invention is described using the example of a sheet metal bending brake attached to a truck body, virtually any tool and even a simple work bench can be supported by the invention, and such a device can be supported on any surface, including a simple building wall.

What is claimed is:

1. A foldable support assembly comprising:
   a mounting channel including a first pivot point, a latch mechanism, and an attachment device for attaching the mounting channel to a surface;
   an extension channel, a first end of which is attached to the first pivot point included in the mounting channel, with the extension channel dimensioned to fit within and to pivot out of the mounting channel, and the extension channel including a second pivot point;
   a tool support, a first end of which is attached to the second pivot point included in the extension channel, with the tool support dimensioned to fit within and to pivot out of the extension channel; and
   an energy storage device, a first end of which is attached to the extension channel and a second end of which is attached to the mounting channel, with the energy storage device dimensioned to fit within the tool support and to be at rest when the extension channel and the tool support are completely within the mounting channel, and with the energy storage device storing energy as the extension channel pivots out of the mounting channel and aiding in lifting the weight of the foldable support assembly as the extension channel is pivoted into the mounting channel.

2. The foldable support assembly of claim 1 further including a latch mechanism to hold the foldable support assembly in a folded position with the extension channel, the tool support, and the energy storage device all interleaved within the mounting channel.

3. The foldable support assembly of claim 1 further including a latch mechanism to hold the foldable support assembly in a folded position with the extension channel, the tool support, and the energy storage device all interleaved within the mounting channel, and a latch release mechanism to permit the foldable support assembly to be unfolded.

4. The foldable support assembly of claim 1 further including a latch mechanism to hold the foldable support assembly in a folded position with the extension channel, the tool support, and the energy storage device all interleaved within the mounting channel, and a latch release mechanism to permit the foldable support assembly to be unfolded, with the latch release mechanism including a device to permit the latch release mechanism to be operated from a location remote from the latch release mechanism.

5. The foldable support assembly of claim 1 wherein the first end of the energy storage device is attached at a location adjacent to the first end of the extension channel.

6. The foldable support assembly of claim 1 wherein the second end of the energy storage device is attached at a location adjacent to the second end of the mounting channel.

7. The foldable support assembly of claim 1 wherein the energy storage device is a spring.

8. The foldable support assembly of claim 1 wherein a sheet metal brake is attached to the tool support.

9. The foldable support assembly of claim 1 wherein the foldable support assembly is attached to a truck rack.

10. The foldable support assembly of claim 1 wherein the foldable support assembly is attached to a truck rack adjacent to the rear of a truck and a second foldable support assembly is attached to the truck rack at a forward location on the truck rack.

11. The foldable support assembly of claim 1 wherein the foldable support assembly is attached to a truck.

12. The foldable support assembly of claim 1 wherein the foldable support assembly is attached to a truck adjacent to the rear of a truck and a second foldable support assembly is attached to the truck at a forward location on the truck.

13. The foldable support assembly of claim 1 further including locking apparatus at each pivot point to prevent any pivoting action of the foldable support assembly when the foldable support assembly is unfolded.

* * * * *